Jan. 12, 1960  R. E. SCHULZE ET AL  2,920,644
LIQUID LEVEL VALVE ASSEMBLY
Filed March 25, 1957  2 Sheets-Sheet 1
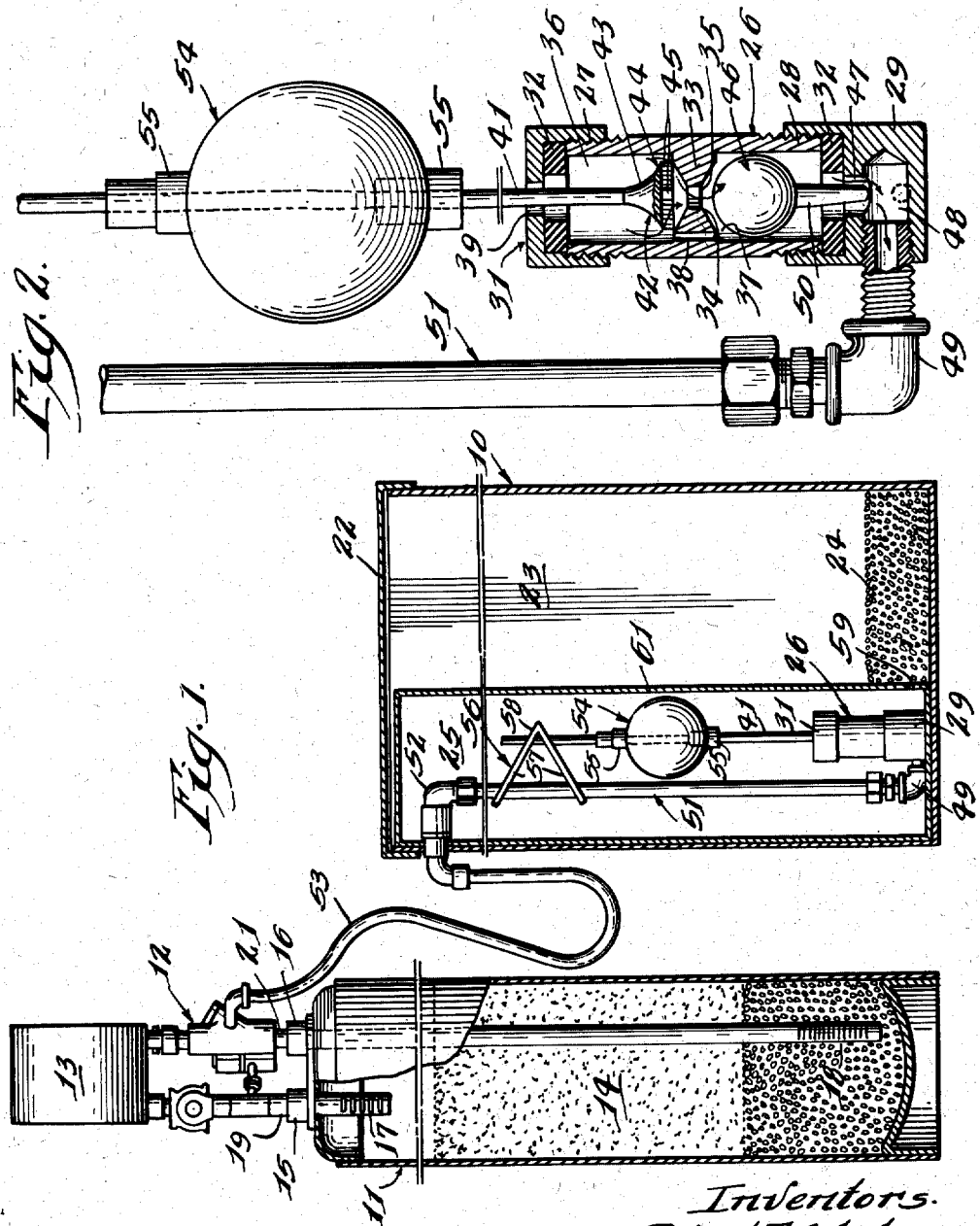
Inventors.
Robert E. Schulze.
Edmund J. Heartstedt.
By. Wilson & Jeppert
Attorneys.

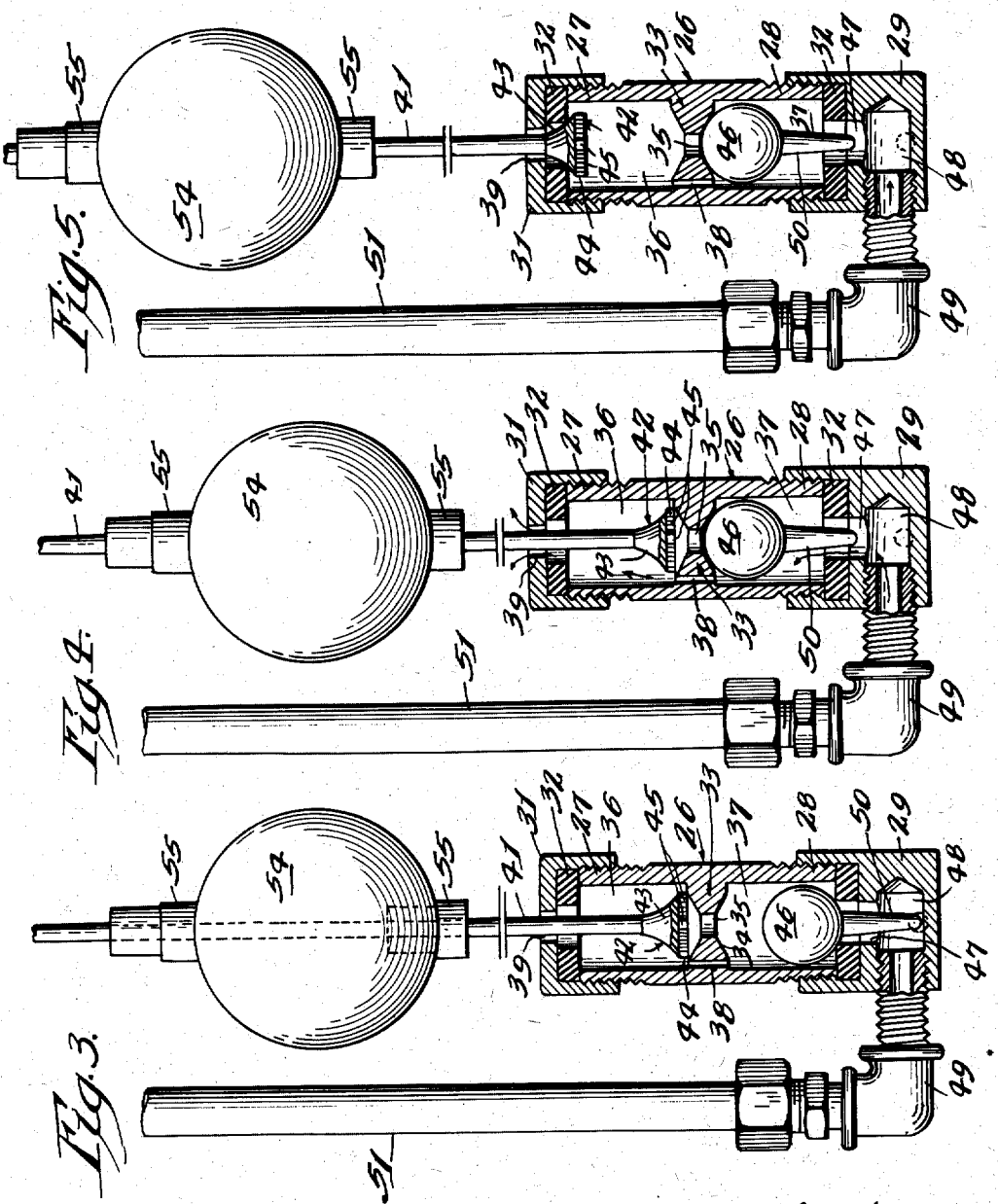

United States Patent Office 2,920,644
Patented Jan. 12, 1960

2,920,644
LIQUID LEVEL VALVE ASSEMBLY
Robert E. Schulze, Deerfield, and Edmund J. Heartstedt, Glenview, Ill., assignors to Culligan, Inc., Northbrook, Ill., a corporation of Delaware
Application March 25, 1957, Serial No. 648,043
4 Claims. (Cl. 137—391)

The present invention relates to an improved liquid level valve assembly of the type in which fluid is permitted to flow through the valve assembly in either direction.

In the operation of water softeners or water conditioners, the active minerals or water treating materials in the tank or container become exhausted and require periodic regeneration or rejuvenation. When exhausted, the minerals may be regenerated with a suitable regenerant, such as sodium chloride, either by adding the salt directly to the contents of the softener tank and rinsing it through with water, or by preparing salt brine in a separate tank or container and causing this regenerant to be drawn into the softener tank and subsequently rinsed therefrom.

In the operation of a brine tank for supplying regenerant to water softeners, a suitable valve arrangement must be provided to control the flow and amount of brine conducted to the softener tank since most of such brine tanks are capable of holding salt sufficient for plural regenerations. This valve assembly may be either manually or automatically controlled, depending upon the attention desired, and when the brine valving is part of an automatic softener system as disclosed in the copending application of Robert E. Schulze, Serial No. 552,845, now Patent No. 2,863,559, filed December 13, 1955, it is essential that the valve assembly permits fresh water to return to the brine tank after regeneration has been completed and thereby replace the water removed therefrom as salt brine or regenerant.

Brine tanks for this purpose may be further classified as (1) wet storage or as (2) semi-dry salt storage. In the wet storage system, the entire volume of salt is submerged in water and a portion of the total liquid volume or brine is withdrawn during regeneration. In the semi-dry salt storage system to which the present invention relates, the bulk of the salt in the brine tank remains dry and only sufficient water is introduced, usually from the bottom, to make enough brine for one regeneration. In this latter system, the total quantity of liquid regenerant is removed and replaced with fresh water during each regeneration cycle.

When the total amount of regenerant has been withdrawn, a valve must be closed or air will be drawn into the softener tank. As this is undesirable, attempts have been made to stop such flow of air and one form of air check valve for accomplishing this purpose is disclosed in the above mentioned Schulze application. However, in the operation of such air check valves, certain problems have arisen such as the valve has a tendency to become air bound and close before the brine can be drawn into the softener tank. When this occurs, the softener cannot be successfully regenerated and a service man must generally be called to correct the difficulty.

The present invention comprehends a novel valve arrangement whereby air binding resulting in early seating of the valve is effectively eliminated and positive control of the valve is assured.

Another important object of the present invention is to provide a novel valve assembly capable of being successfully and positively operated over a wide range of water supply pressures.

A further object of the present invention is the provision of a novel compact and efficient valve assembly and one in which servicing may be simply effected.

The present invention further comprehends the provision of a novel valve assembly in which flow is restricted in one direction and flow in the other direction is relatively unrestricted.

Another object of the present invention is to provide a valve assembly having novel means for variation in level control.

A still further object of the present invention is the provision in a novel valve assembly of interchangeable ball valves of varying density to accommodate the extreme in operating conditions. By making the balls of different densities, the position of the ball may be varied.

A further object is the provision of a novel ball valve molded of a plastic composition and having a tail or locating projection maintaining the ball in the valve body in a substantially vertical position and preventing its free rotation, whereby positive sealing is effected when the valve is moved to closed position.

Further objects are to provide a construction of maximum simplicity, efficiency, economy and ease of assembly and operation, and such further objects, advantages and capabilities as will later more fully appear and are inherently possessed thereby.

In the drawings:

Figure 1 is a view in front or side elevation of the apparatus of an automatic water softener or conditioning system embodying the present invention of a novel liquid level valve assembly in the brine tank of the system, the brine tank being shown in vertical cross section to show more clearly the valve assembly in the tank.

Fig. 2 is an enlarged fragmentary view, part in side elevation and part in vertical cross section through the novel valve assembly with the component parts shown in the position they occupy when brine is being drawn from the brine chamber of the brine tank into the softener tank.

Fig. 3 is a view similar to Fig. 2 but showing the position of the parts when brine ceases to flow to the softener tank from the brine tank and the ball check valve seats and prevents air flow into the softener tank.

Fig. 4 is a view similar to Figs. 2 and 3 but showing the valve parts in position for allowing a predetermined quantity of fresh water to flow into the brine tank to from a new supply of regenerant.

Fig. 5 is a view similar to Figs. 2, 3 and 4 but showing the valve parts in position for stopping flow of fresh water into the brine tank.

Referring to the disclosure in the drawings wherein there is shown a novel illustrative embodiment of the present valve assembly for controlling the liquid level in a brine tank 10 for supplying regenerant to a water softener or conditioning system including a softener tank 11 and automatic control mechanism designated generally by the reference character 12, the operation of the control mechanism being initiated by a timer 13 for the automatic regeneration of the active ingredients 14 in the tank 11 at a designated time period.

While regeneration is automatically effected in the home, the softener tank 11 is disclosed as being of the service type so that it may be disconnected from the automatic control mechanism 12 and bodily removed when necessary for complete regeneration, sterilization and removal or replacement of the contained minerals or active ingredients 14 by the service operator at a place remote from the home. When removed, it is replaced by a similar tank containing active ingredients whereby service is maintained.

To facilitate removal of the tank 11 and replacement with another similar tank containing active ingredients, each softener tank is provided with suitable fittings at 15 and 16, one of which is connected to a depending inlet tube and manifold 17 that is readily removable and the other to a depending outlet tube and manifold 18. Each fitting 15 and 16 and connection to the control mechanism 12 through connectors 19 and 21, respectively, is preferably provided with a slip connector of the type shown in the Culligan Patent No. 2,265,268, of December 9, 1941, for detachably connecting the tank 11 to complementary coupling members on the depending connectors 19 and 21.

The brine tank 10, softener tank 11, automatic control assembly 12 and timer 13 herein shown are generally of the type illustrated in the above mentioned Schulze application Serial No. 552,845, in which to accomplish regeneration of the contained minerals 14.

The brine tank 10 is provided with a removable cover 22 for access to a salt chamber 23 of such size as to accommodate a substantial quantity of sodium chloride sufficient for repeated regeneration, the salt preferably being deposited on a bed of gravel 24 through which the brine is filtered. In the interior of the tank and separated from the salt chamber 23 is a vertically arranged float chamber 25 provided with a float valve assembly for controlling the flow and quantity of brine or regenerant supplied to the softener tank 11 and the flow of fresh water into the brine tank 10 after regeneration is completed to replace the water removed as salt brine.

The float valve assembly comprises a valve body or housing 26 externally threaded at its opposite ends 27 and 28 for attachment at its lower end to an internally threaded base 29 and at its upper end to receive an internally threaded cap or cover 31. A gasket or annular sealing washer 32 is provided at each end to form an effective seal between the body 26, base 29 and cap or cover 31.

Intermediate its ends the valve body 26 is provided with a transverse wall or partition 33 with the opposite faces of its central portion 34 dished and provided with a central port 35 communicating between an upper chamber 36 and a lower or air check chamber 37. A by-pass 38 is also provided in the wall or partition 33 to form an open passage between these chambers of the valve body.

The cap or cover 31 is provided with a central bore or opening 39 through which loosely projects the lower portion of a float stem 41 to the lower end of which is affixed a valve member 42 so as to be vertically movable with the float stem or rod 41. The valve member 42 is provided with a downwardly and outwardly flared shank portion 43 merging into an enlarged head or valve seating portion 44 with its lower face provided with diametrically arranged slots 45 whereby when the float rod 41 is lowered (Fig. 2) to seat the valve member 42 upon the upper surface of the ported transverse wall 33, liquid entering the valve body through the bore or opening 39 in the cover or cap 31 is adapted to flow from the upper chamber 36, through the slots 45 and port 35 in the transverse wall 33 into the lower or air check chamber 37 of the valve body 26.

In the lower or air check chamber 37 of the valve body 26 is provided a ball valve 46 preferably of a plastic or other composition unaffected by the brine and capable of seating upon the ported gasket 32 in the base 29 when lowered, or to seat against the underside of the transverse wall or partition 33 when elevated. When the ball valve 46 is in its fully lowered position (Fig. 3), it seals off flow through the lower ported gasket 32 and connected bores or passages 47 and 48 in the base 29, through the connected L 49 and tubing or pipe 51, the latter being connected through an L 52 to one end of a section of plastic or flexible tubing 53, the other end of this tubing 53 being connected to the automatic control assembly 12. To maintain the ball in a vertical position and prevent free rotation thereof, it is provided with a tail or locating projection 50 depending into and through the passage 47.

The float stem 41 carries intermediate its length and outside the valve body 26 a float ball 54 that is adjustably mounted on the stem and held in adjusted position by an upper and a lower float ball retainer or positioner 55. By raising or lowering the position of the float ball 54 on the stem 41, the amount of brine for regeneration may be increased or decreased by controlling the quantity of water delivered to the brine tank 10 for dissolving salt. To guide the float stem in its vertical movement and controlled by the depth of liquid in the float chamber 25, there is provided a substantially V-shaped guide 56 having its spaced legs 57 anchored on the pipe or tubing 51 and with the stem 41 passing through openings in these legs adjacent the apex 58.

The chamber 23 of the brine tank is of substantial capacity and capable of storing a large quantity of dry, bulk salt and sterilizing agent sufficient to supply the regenerant or brine needs for a substantial period of time. Fresh water entering and collecting to the desired depth in the float chamber 25 after completion of the regeneration cycle is open to the salt chamber 23 through one or more openings or connecting ports 59 in the wall 61 separating these chambers.

In the operation of the novel brine valve assembly during the regeneration cycle, brine collected to the desired depth in the float chamber 25 enters the upper chamber 36 of the valve body 26 through the opening or port 39 in the cap or cover 31 (Fig. 2). From the chamber 36, this brine passes through the slots 45 in the valve seating portion 44 of the valve member 42, and then through the central port 35 of the transverse wall or partition 33 and into the lower or air check chamber 37 of the valve body. From this air check chamber 37 this brine passes downwardly through the port in the lower gasket 32 and into the connecting passages 47 and 48, and then drawn upwardly through the tubing 51 of the brine line to the automatic softener for regenerating the minerals contained in the softener tank 11.

Brine continues to follow the path outlined above until the level of the brine in the float chamber 25 drops to the top of the port or opening 39 in the cap 31 of the valve body 26. Thereupon air is drawn into the valve body through the port 39 and follows the path of the brine as above described until the air reaches the lower or air check chamber 37, at which time the ball valve 46 sinks and seals off the port in the lower gasket 32, thereby stopping all flow of brine and air (Fig. 3). The ball valve 46 remains in this lowered position until the brine is rinsed from the softener tank 11 as part of the predetermined automatic cycle controlled in the manner disclosed in the above mentioned copending Schulze application Serial No. 552,845, and for the period determined by the timer 13 for regeneration of the softener.

When regeneration ceases, fresh water is permitted to flow under pressure in the tubing 51 and to enter the valve body 26 through the passages 47 and 48 and port in the gasket 32 of the base 29. This water entering the lower chamber 37 lifts or buoys up the ball valve 46 to close and seal off the central port 35 in the transverse wall or partition 33 (Fig. 4) as water pressure builds up in the lower chamber 37. However, water is permitted to flow to the upper chamber 36 through the relatively small orifice or open by-pass 38 which limits the flow so as not to raise the valve seating member 42 due to velocity head. Water flowing through the orifice or open by-pass 38 enters the upper chamber 36 of the valve body 26 and exits through the port or opening 39 into the float chamber 25 and from the float chamber through the port or passage 59 in the dividing wall 61 into the base or lower portion of the salt chamber 23.

Water continues to flow into the brine tank 10 until it reaches the level of the float 54 in the float chamber 25, whereupon continued flow raises this float and its stem or rod 41 until the valve member 42 on the lower end of the stem reaches the position shown in Fig. 5 when the upwardly and outwardly flared shank 43 enters the opening in the upper gasket 32, seats against this encompassing gasket and provides a water tight seal thereat as pressure builds up in the upper chamber 36 of the valve body 26. Thus the flow of water into the brine tank is stopped until fresh water is again required after regeneration.

The valve body 26 is made symmetrical so that either end may be the lower end affixed to the base 29 and the other end receive the cap or cover 31. Also the ported gaskets, sealing rings or washers 32 are identical and thus interchangeable. This is a distinct advantage in the manufacture and assembly of the valve unit.

The float ball 54 being adjustable upon the float stem or rod 41, the level of fresh water entering the brine tank 10 and thus determining the quantity of brine available for regeneration, may be accurately adjusted and controlled. Also the present invention contemplates the provision of ball valves 46 of different densities and their ready interchangeability to suit extremes in operating conditions.

With the float 54 elevated to close the port 39 by the valve member 42 on the float stem or rod 41, and the ball or air check valve 46 elevated by the pressure of the fresh water, all as shown in Fig. 5, the quantity of brine collected in the float chamber 25 and controlled by the adjusted position of the float 54 on its valve stem 41, remains in this chamber 25 until the automatic regeneration cycle is initiated by the timer 13 through the automatic control mechanism in the manner disclosed and described in the above mentioned copending Schulze application Serial No. 552,845. In such regeneration cycle, the brine or regenerant is withdrawn by means of an eductor through the valve body 26, through the connected passages 47 and 48 and tubing 51 and 53, downwardly through the normal outlet pipe and manifold 18, upwardly through the bed of minerals 14 and outwardly through the normal inlet manifold 17 to waste.

Having thus disclosed the invention, we claim:

1. A liquid level valve assembly, comprising a valve body provided at its opposite ends with a valve seat and a passage therethrough, a single conduit for supplying liquid to said valve body and for withdrawing liquid therefrom, a transverse partition in said valve body dividing said body into an upper and a lower chamber with said partition provided with a port and a restricted by-pass connecting said chambers, a valve member in said upper chamber adapted to be elevated to engage the upper valve seat and close its passage, a float exterior to and above said valve body, a float stem depending from said float with an end of said stem projecting into the upper chamber of the valve body and thereat carrying said valve member, said valve member being slotted and in its lowered position seating upon said partition with said slots directing flow of liquid from said upper chamber, through the port of said partition into the lower chamber and to said conduit, and in its elevated position said valve member engages the upper valve seat and stops flow of liquid from said conduit through said valve body, and a buoyant air check ball valve in the lower chamber of the valve body which when elevated by entering liquid from said conduit seats against the underside of said partition and closes its port to restrict flow through said by-pass and when lowered upon the exhaustion of liquid entering the valve body and passing to the conduit seats upon the lower valve seat and closes the lower passage and prevents air being drawn into said conduit.

2. A liquid level valve assembly, comprising a valve body having a partition dividing the interior thereof into an upper and a lower chamber with said partition having a central port and a restricted, open by-pass therethrough connecting said chambers, a single conduit for supplying liquid through said valve body and for subsequently withdrawing liquid therefrom, a base for said valve body having a valve seat and a passage connecting said conduit to the lower chamber, a top closure for said valve body having a valve seat and a port in the upper chamber of the valve body, a valve member in said upper chamber, a float stem projecting through the port in said closure and connected at its lower end to said valve member, a float on said float stem above said valve body, said float and float stem when elevated moving the valve member into engagement with its valve seat to close the port in the closure and thereby stop flow of liquid from said conduit, said valve member when lowered by the float and float stem seating upon the upper face of but permitting flow through the port of said partition, a buoyant air check valve in the lower chamber lowered into sealing engagement with the valve seat in the base as liquid ceases to flow from the valve body to the conduit thereby preventing passage of air from the valve body into said conduit, said air check valve when elevated by the liquid entering from said conduit engaging the underside of said partition to close its port and restricting the passage of the entering liquid through said by-pass.

3. A liquid level valve assembly, comprising a valve body having a partition dividing the interior thereof into an upper and a lower chamber, said partition having a port and an open but restricted orifice connecting said chambers, a conduit for supplying liquid to the valve body and for the withdrawal of liquid therefrom, a base for said valve body having a valve seat and a port connected to the conduit, a cover for said valve body having a valve seat and a port for the passage of liquid through the connected chambers of the valve body and the port in its base into the conduit and for the passage in a reverse direction of liquid from said conduit into the valve body, a valve member in said upper chamber, a float stem projecting through the cover and connected at its lower end to said valve member, a float on said float stem above said valve body, said float when elevated by the liquid from said conduit elevating said float stem and moving its valve member into engagement with the valve seat and closing the port in the cover to stop flow of liquid from said conduit, and when said valve stem and valve member are lowered by the float, the bottom of said valve member abuts said partition with said bottom being transversely slotted for the passage therethrough of the liquid to the port of said partition, a buoyant ball in the lower chamber and lowered into sealing engagement with the valve seat in the base of the valve body to prevent the passage of air into the conduit when the liquid entering the valve body and passing to the conduit is exhausted and closing the port in said partition when elevated by the entering liquid to restrict flow of this liquid through the restricted orifice of said partition in the valve body.

4. A liquid level valve assembly as set forth in claim 3, in which said buoyant ball has a depending projection for maintaining said buoyant ball against free rotation.

References Cited in the file of this patent

UNITED STATES PATENTS

| Number | Name | Date |
|---|---|---|
| 214,463 | Smith | Apr. 15, 1879 |
| 404,400 | Gunckel | June 4, 1889 |
| 797,255 | Beers | Aug. 15, 1905 |
| 942,368 | Dyer | Dec. 7, 1909 |
| 1,023,012 | Gilbert | Apr. 9, 1912 |
| 1,889,231 | Wahlbom | Nov. 29, 1932 |
| 1,905,021 | Wagner | Apr. 25, 1933 |
| 1,982,062 | Mathews | Nov. 27, 1934 |
| 1,999,439 | Braun | Apr. 30, 1935 |
| 2,065,962 | Bowers | Dec. 29, 1936 |
| 2,352,630 | Griswold | July 4, 1944 |
| 2,370,190 | Ralston | Feb. 27, 1945 |
| 2,415,875 | Greenwald | Feb. 18, 1947 |
| 2,716,422 | Whitlock | Aug. 30, 1955 |
| 2,751,347 | Miller | June 19, 1956 |
| 2,827,915 | Mitchell | Mar. 25, 1958 |

UNITED STATES PATENT OFFICE

CERTIFICATE OF CORRECTION

Patent No. 2,920,644                  January 12, 1960

Robert E. Schulze et al.

It is hereby certified that error appears in the printed specification of the above numbered patent requiring correction and that the said Letters Patent should read as corrected below.

Column 2, line 46, for "from" read -- form --.

Signed and sealed this 5th day of July, 1960.

(SEAL)
Attest:
KARL H. AXLINE
Attesting Officer

ROBERT C. WATSON
Commissioner of Patents